United States Patent [19]
Boucher et al.

[11] Patent Number: 4,930,366
[45] Date of Patent: Jun. 5, 1990

[54] ELECTRICAL TRANSMISSION CONTROL MECHANISM

[75] Inventors: Val G. Boucher, Roanoke; Weldon L. Phelps, Dunlap; Daniel R. Ekstrand, Pekin, all of Ill.

[73] Assignee: Caterpillar Inc., Peoria, Ill.

[21] Appl. No.: 220,865

[22] Filed: Jul. 18, 1988

[51] Int. Cl.$^5$ .................. F16H 3/08; B60K 20/00
[52] U.S. Cl. .................. 74/365; 74/473 R; 200/61.54
[58] Field of Search ........... 74/473 R, 473 S W, 365, 74/475; 200/61-54, 61-88; 307/10.1

[56] References Cited

U.S. PATENT DOCUMENTS

| | | | |
|---|---|---|---|
| 2,795,963 | 6/1957 | Alfieri | 74/365 X |
| 3,138,966 | 6/1964 | Kempf et al. | 74/365 |
| 3,182,778 | 5/1965 | Droschel | 192/92 |
| 3,335,618 | 8/1967 | Russey | 74/365 X |
| 3,417,635 | 12/1968 | Day et al. | 74/484 |
| 3,613,480 | 10/1971 | Shull | 74/733 |
| 3,640,156 | 2/1972 | Mori et al. | 74/866 |
| 3,675,508 | 7/1972 | Blank | 74/74.5 |
| 3,894,443 | 7/1975 | Beig et al. | 74/476 |
| 4,158,404 | 6/1979 | Yamashita et al. | 192/3.58 |
| 4,218,938 | 8/1980 | Hattori | 74/365 X |
| 4,334,130 | 6/1982 | Beig | 200/61.54 |
| 4,429,196 | 1/1984 | Beig et al. | 200/61.54 |
| 4,444,072 | 4/1984 | Grimes et al. | 74/365 X |
| 4,541,497 | 9/1985 | Riediger et al. | 74/471 R X |
| 4,610,179 | 9/1986 | Parker | 74/473 R X |
| 4,745,826 | 5/1988 | Nishikawa et al. | 74/866 |
| 4,798,099 | 1/1989 | Alexander et al. | 74/473 R |
| 4,817,468 | 4/1989 | Leigh-Monstevens et al. | 74/365 X |

Primary Examiner—Dirk Wright
Attorney, Agent, or Firm—Charles E. Lanchantin, Jr.

[57] ABSTRACT

An electrical transmission control mechanism includes first and second control members which are individually limitedly rotatable to respectively select the directional and neutral modes or the speed ratio modes of a transmission. First and second electrical rotary type switching devices which are respectively responsive to the movement of the control members are disposed within the mechanism for controllably disconnecting the supply and ground side leads of one of a plurality of transmission clutch actuating solenoids and connecting the supply and ground side leads of another one to minimize the possibility of any inadvertent electrical short in causing unexpected operation of the transmission. Each of the compact and reliable rotary switching devices has a plurality of upstanding contact members arranged at preselected radii and a plurality of radially oriented wiper members that make selected contact with pairs of the contact members to provide a multitude of desirable operating functions. The mechanism features a simple and yet rugged arrangement of the control members and the switching devices that is easy to operate.

17 Claims, 5 Drawing Sheets

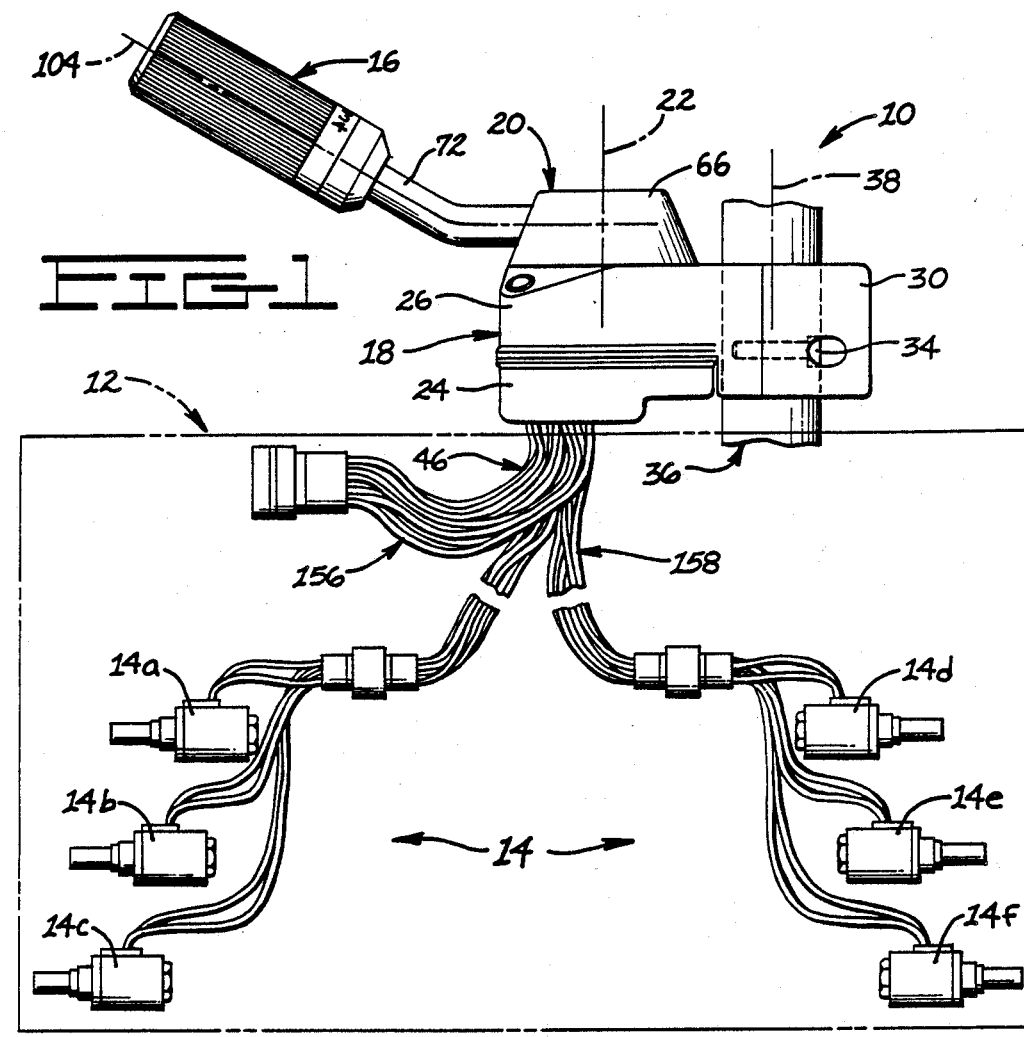
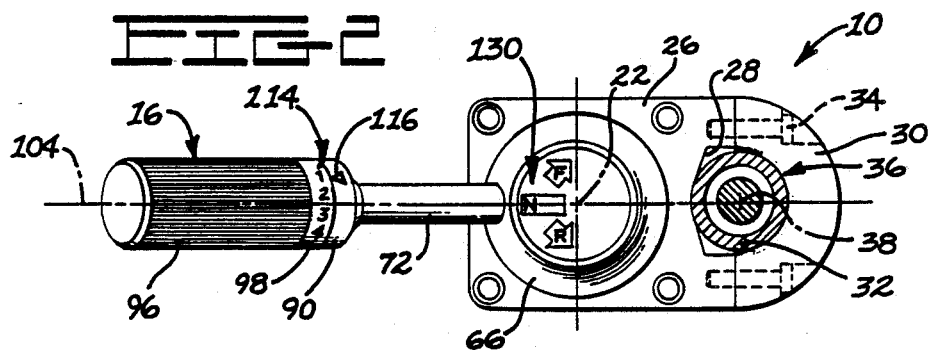

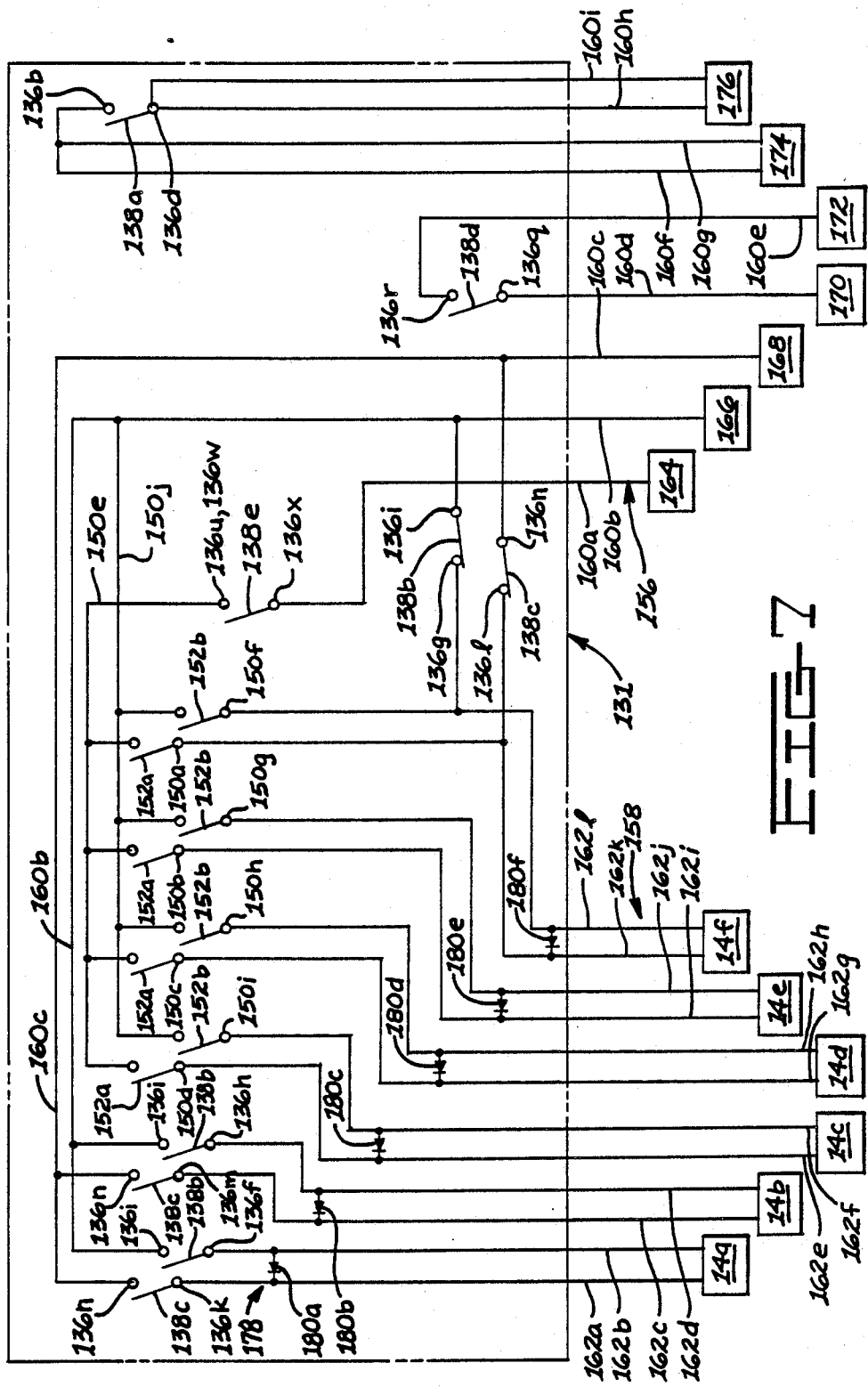

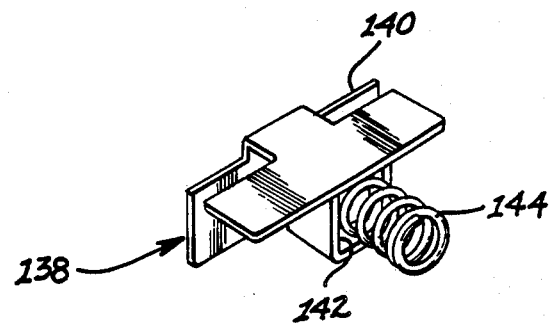
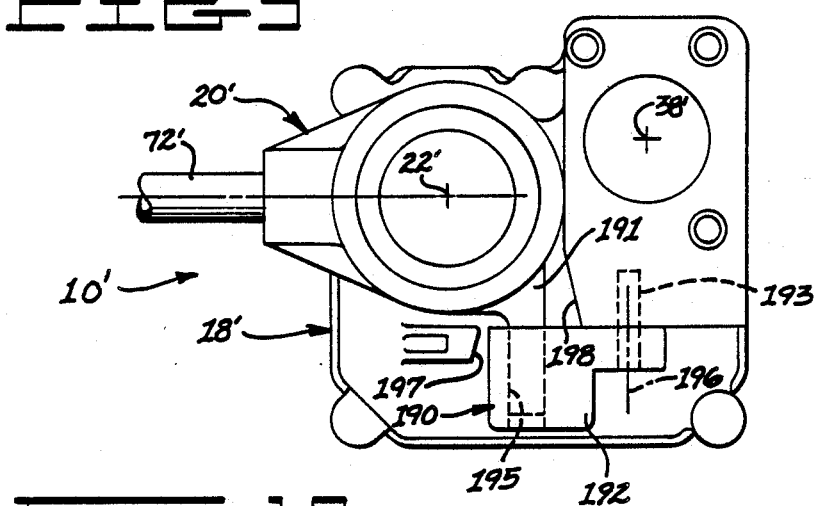
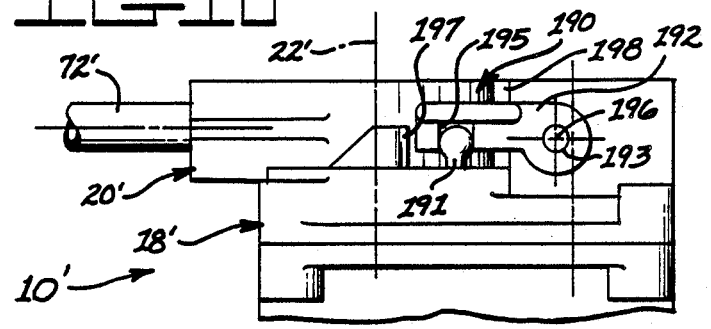

ELECTRICAL TRANSMISSION CONTROL MECHANISM

TECHNICAL FIELD

This invention relates generally to a mechanism for controlling the operation of a transmission, and more particularly to a manually-operated, electrically-actuated control mechanism for shifting a plurality of clutch actuating solenoids operatively associated with the transmission of a vehicle or the like.

BACKGROUND ART

U.S. Pat. No. 3,417,635 issued Dec. 24, 1968 to R. R. Day, et al discloses a single shaft control lever mounted on a steering column for swinging movement parallel to the steering wheel between forward and reverse positions, and for rotation about its own axis to change the speed ranges. The control lever is adapted to displace two spool valves through the two linkage mechanisms. U.S. Pat. No. 4,541,497 issued Sept. 17, 1985 to C. W. Riediger, et al shows another control mechanism using a laterally extending tiller arm swingably mounted on a fixed upstanding axis between a forwardly located position steering the vehicle in one direction and a rearwardly located position steering the vehicle in the other direction. A handgrip portion on the tiller arm can be revolved around its own axis to change the direction of the vehicle. In this instance, a separate speed lever was used to control the speed steps of the transmission, and separate mechanical linkages were used to couple the tiller arm, handgrip portion and speed lever to the remotely located spool valves. U.S. Pat. Nos. 3,417,635 and 4,541,497 are generally illustrative of the widely used, but relatively complex and costly mechanical linkage systems for connecting the operator controls to a remotely located transmission. Although generally successful, such mechanical linkage systems are difficult to assemble, disassemble and adjust. Moreover, because the location of the operator controls and the transmission varies from vehicle to vehicle, separate linkage mechanisms must be provided for each one. Accordingly, one of the objects of the present invention is to provide a reliable, and yet economical, electrically actuated transmission control mechanism that could have universal adaptability to a wide variety of applications.

U.S. Pat. No. 3,138,966 issued June 30, 1964 to D. D. Kempf, et al discloses a transmission control mechanism utilizing a plurality of microswitches disposed in fixed positions and actuated by a cam. These microswitches take up considerable space and are relatively expensive because they have resilient metal arms that are deflected continually over a long service period and are constructed to resist fatigue failure. Moreover, each one of the solenoids actuated by that control mechanism has the usual continually grounded line associated therewith. This is a disadvantage in that any inadvertent short in the wires or elements serially connected to the electrical power supply line leading to a single one of these solenoids could cause an unexpected movement of the vehicle. For example, with the engine running and the transmission placed in neutral, the control members might be jarred or bumped with a tool during a service check such that electrical power is communicated to just one of the solenoids through an unexpected short. While this is unlikely, it is conceivable—especially with older and dirtier mechanisms.

One desirable alternative to deflectable arm type microswitches is illustrated in U.S. Pat. No. 4,158,404, issued June 19, 1979 to S. Yamashita, et al. This patent illustrates a rotary switching device utilizing a rotatable member supporting a plurality of radially oriented contact elements which are resiliently biased toward a stationary member supporting sets of arcuately arranged contact members. With the actuation of a remotely disposed gearshift lever, the contact elements are rotated so they selectively wipe across or bridge the contact members and energize a single solenoid operated valve actuator for an input clutch. While this type of rotary switching device is desirable from the standpoint of compactness, reliability and low cost it is not efficiently utilized, and that apparatus still relies on the direct mechanical movement of a plurality of synchronizers for shifting the transmission itself. U.S. Pat. No. 4,745,826, issued May 24, 1988 to S. Nishikawa, et al also discloses this desirable type of switching device for a transfer gear mechanism in order to provide two wheel and four wheel high speed drive and four wheel low speed drive. However, that mechanism requires a complicated electronic control unit, does not locate and efficiently integrate the switching device at a desirable location immediately adjacent the operators hand control, and does not include an electrical system in conjunction with the switching device that would provide the desired degree of reliability and service life of the mechanism.

Thus, what is needed is an electrical transmission control mechanism using an easily operated and compact control assembly containing one or more reliable rotary switching devices therein immediately adjacent the operators hand. The control assembly should require minimal effort to shift it between the various operating positions thereof, and should incorporate appropriate detent means to enable the individual positions to be easily and positively selected. Moreover, the control assembly should preferably be constructed primarily of electrically nonconductive materials such as lightweight, rugged plastics and be positively sealed to exclude dirt and moisture from the electrical portion of the circuitry contained within it. And, still further, the control assembly and electrical circuitry used therewith should be adaptable to a wide spectrum of control assembly shift patterns and vehicle variations, and should preferably be adaptable to positively control both sides or leads of the solenoids being manipulated during the shifting process.

The present invention is directed to overcoming one or more of the problems as set forth above.

DISCLOSURE OF THE INVENTION

In one aspect of the present invention, there is provided an electrical transmission control mechanism for shifting a transmission by selectively controlling a plurality of clutch actuating solenoids, and including a control assembly, a support assembly for pivotally supporting the control assembly for movement about a central axis, and electrical means for controllably disconnecting the supply and ground side leads of one of the solenoids and connecting the supply and ground side leads of another one of the solenoids and shifting the transmission in response to movement of the control assembly about the central axis.

In accordance with another aspect of the present invention, there is provided an electrical transmission control mechanism for shifting a transmission by controllably actuating a plurality of clutch actuating solenoids, and including a control assembly, a support assembly for pivotally supporting the control assembly for limited rotation about an axis, and electrical means for changing the transmission speed ratio and/or direction of rotation of the transmission output by actuating individual ones of the solenoids with swinging movement of the control assembly. Advantageously, the electrical means includes a rotary switching device connected between the control assembly and the support assembly including a switching contact board defining a plurality of contact members arranged at preselected radii about the axis, and a plurality of radially oriented wiper members connected to the control assembly for controlled bridging engagement against selected pairs of the contact members.

In accordance with a further aspect of the present invention, there is provided an electrical transmission control mechanism for shifting a transmission by controllably actuating a plurality of directional clutch actuating solenoids and a plurality of speed clutch actuating solenoids. First and second control members are supported for relative pivotal movement by support means, and electrical means are incorporated for changing the speed ratio and/or the direction of rotation of the transmission output. Particularly, the electrical means includes first and second rotary switching devices individually including a switching contact board defining a plurality of contact members arranged at preselected radii from a central axis thereof, and a plurality of radially oriented wiper members for bridging engagement against selected pairs of the contact members. In use the first control member is movable to cause relative sweeping movement between the wiper and contact members of the first rotary switching device and the actuation of a selected directional clutch actuating solenoid, and the second control member is similarly movable to operate the second rotary switching device and cause the actuation of a selected speed clutch actuating solenoid.

In the embodiment illustrated, a control member extends radially outwardly of a control assembly which is rotatably supported for movement about a generally upstanding axis between forward, neutral and reverse establishing positions. The control member is further adapted to be rotated about its own axis for establishing one of a plurality of transmission gear ratio establishing positions. A first rotary type switching device is associated with the rotation of the control assembly about the upstanding axis, while a second rotary type switching device is associated with the rotation of the control member about its own axis. These switching devices are compactly and efficiently contained within a plurality of plastic elements, and are associated with an electrical circuit to achieve the aforementioned operating modes. Also, these rotary switching devices respond to the rotation of the control assembly and/or the control member to disconnect both leads of one solenoid and to connect both leads of another solenoid, and this is highly desirable for reliability and safety purposes. The electrical circuit further includes means for preventing starting of the engine while the control member is in forward or reverse and for causing an alarm to be sounded when reverse is selected. Moreover, in neutral, the electrical circuit assures that one specific speed clutch is engaged.

BRIEF DESCRIPTION OF THE DRAWINGS

FIG. 1 is a diagrammatic, rear elevational view of an electrical transmission control mechanism constructed in accordance with an embodiment of the present invention;

FIG. 2 is a diagrammatic, top plan view of the control mechanism shown in FIG. 1;

FIG. 7 is an electrical circuit line diagram of the electrical transmission control mechanism of the present invention;

FIG. 8 is a diagrammatic, enlarged and perspective view of a typical wiper member as shown in FIG. 3;

FIG. 9 is a diagrammatic, fragmentary top plan view of an alternate embodiment electrical transmission control mechanism showing a useful interlock device associated therewith; and FIG. 10 is a diagrammatic, fragmentary side elevational view of the alternate embodiment control mechanism of FIG. 9.

BEST MODE FOR CARRYING OUT THE INVENTION

Figure 3:
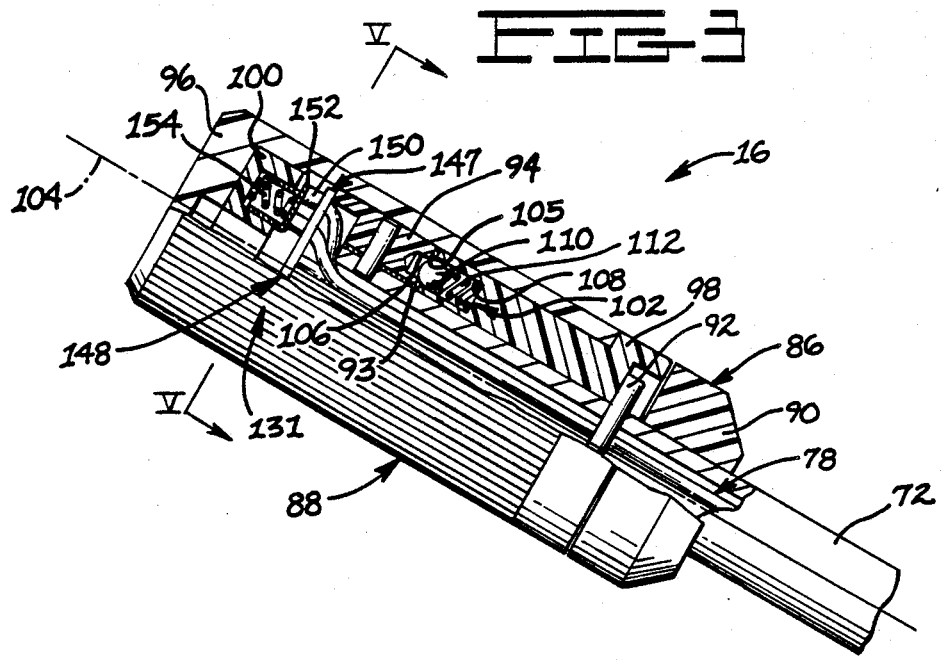
FIG. 3 is a diagrammatic, enlarged, and fragmentary view of a portion of the control mechanism shown in FIGS. 1 and 2 with the upper half broken open and shown in cross section to illustrate details of construction thereof.

Referring to FIGS. 1 and 2, an electrical transmission control mechanism 10 is shown for shifting a conventional power shift transmission indicated only generally by the reference number 12 by controllably actuating a plurality of electro-magnetic actuators or clutch actuating solenoids 14. These transmissions typically include a plurality of hydraulically actuated disc-type clutches or brakes, and can be of the planetary gear train type or the countershaft gear train type. In the instant embodiment the manual manipulation of a single actuator 16 is effective to selectively actuate six solenoids 14a–14f.

The transmission control mechanism 10 includes a stationary lower support assembly 18 and an upper control assembly or turret assembly 20 that carries the actuator 16 and is mounted on the support assembly for limited rotation about an upright or substantially vertical central axes 22. The support assembly has a lower housing 24, an upper housing 26 connected thereto and defining a contoured cavity 28, and a retaining cap 30 defining a semi-cylindrical cavity 32. The retaining cap is releasably secured to the upper housing by a plurality of fasteners or bolts 34 screwthreadably received in the upper housing, so that these members are adaptable to clampingly embrace within the facing cavities a conventional steering wheel column 36 having an upright central axis 38 substantially parallel with the central axis of the control assembly.

Figure 4:
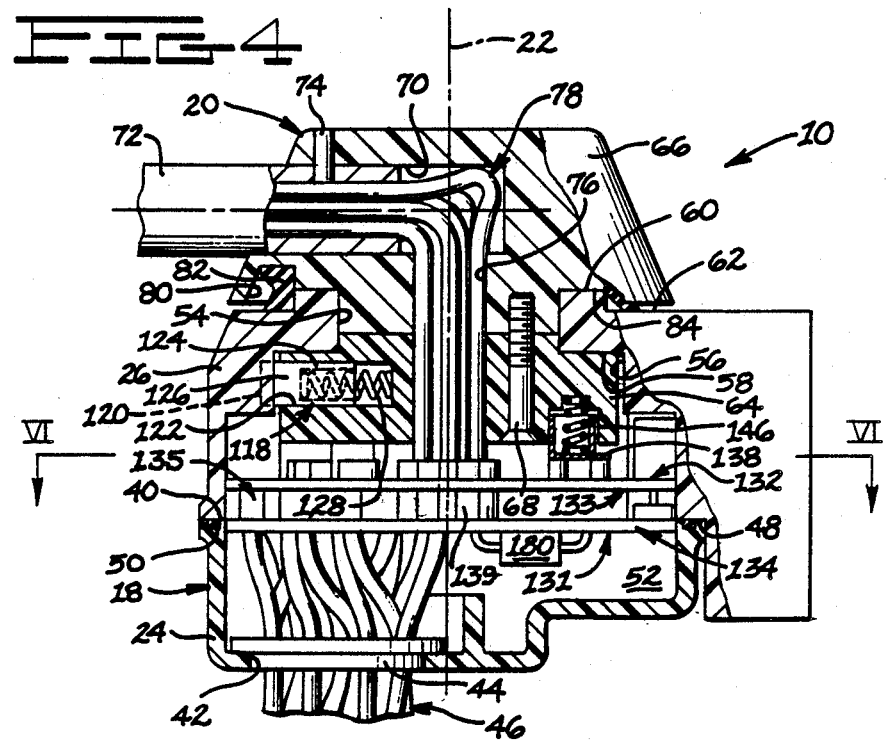
FIG. 4 is a diagrammatic, enlarged, and fragmentary cross sectional view of another portion of the control mechanism shown in FIGS. 1 and 2 illustrating details of construction thereof.

Referring to FIG. 4, the lower housing 24 has an upwardly facing peripheral edge 40, and an upright cylindrical passage 42 therethrough which is adapted to receive a potted grommet 44 that encapsulates and holds in place in a water-proof manner a plurality of electrical lines collectively defining a first wiring harness 46. The upper housing 26 has a downwardly facing peripheral edge 48 which mates with the edge 40 of the lower housing, and a seal ring 50 is inserted peripheral about the support assembly 18 between these edges to define a substantially enclosed chamber 52 between the support and control assemblies. The upper housing also has a first cylindrical bore 54, a larger second peripherally profiled cylindrical bore 56, and a downwardly facing shoulder 58 therebetween which are concentrically arranged along the central axis 22. Moreover, the top of the upper housing defines an upwardly facing annular bearing seat 60 and an annular seal engaging seat 62.

The pivotable upper control assembly 20 includes a lower plate member 64 and an upper turret member 66 which are releasably connected together by a plurality of fasteners or screws 68 which extend upwardly into screwthreaded engagement with the turret member, although only one fastener is shown. A blind cylindrical passage 70 is radially defined in the turret member which receives the actuator 16 including a tubular handle or first control member 72 which extends radially outwardly from the central axis 22, and a retaining pin 74 extends tightly through the turret member and the handle to secure them together. Another cylindrical passage 76 is defined in the turret member concentrically with the pivot axis 22 which openly intersects with the passage 70 so that a second wiring harness 78 can be extended therethrough and through the tubular handle. An annular, downwardly facing groove 80 in the turret member is adapted to receive a seal ring 82 which is rotatable with the turret member and sealingly engages the seat 62. The turret member has a downwardly facing bearing seat 84 which engages the upwardly facing bearing seat 60 of the upper housing 26, and the turret member is thus supported thereby.

Referring next to FIG. 3, the actuator 16 includes a mounting portion 86 on the tubular handle 72 and a twistable hand grip portion 88 at the distal end of the handle. The mounting portion includes a collar 90, a metal roll pin 92, a flanged tubular metal guide 93, and an annular support member 94 seated on the guide and rigidly secured to the handle or first control member 72. The hand grip portion 88 serves as a second control member and further includes a tubular hand grip 96 which is connected for joint rotation with a tubular handle body 98, and a hollow cylindrical insert or wiper-holding plug 100 seated within the hand grip.

A first detent apparatus 102 is provided for assuring positive indexing of the hand grip portion 88 as it is rotatably twisted on the mounting portion 86 about a central axis 104 of the tubular handle 72. The detent apparatus is defined in part by a plurality of aligned stationary cylindrical passages 105 and corresponding plurality of pockets 106 formed in the wear-resistant, flanged tubular metal guide 93 and the support member 94 respectively at generally equally spaced intervals about the axis 104. It is further defined by a plurality of movable cylindrical pockets 108 formed in the handle body 98, a plurality of ball bearing members 110, and a plurality of coiled compression springs 112 received in the movable pockets 108 and individually urging the respective ball bearing member axially into engagement with selected ones of the aligned guide passages 105 and the stationary pockets 106 with the forces being balanced around the periphery to reduce cocking. The hand grip portion 88 can thus be rotated a preselected angular amount, for example approximately 30° between the stationary pockets 106, to achieve one of a plurality of transmission gear ratios or speeds at the output thereof. As shown in FIG. 2, the instant embodiment has indicia 114 on the rotatable handle body 98 which align with a stationary pointer 116 on the collar 90 so that the first, second, third and fourth speed ranges of the transmission 12 can be easily selected.

While the hand grip portion 88 has an axially oriented detent apparatus 102 for radial compactness, a second detent apparatus 118 of the radially oriented type is provided between the control assembly 20 and the support assembly 18 as is best shown in FIG. 4. Although only partially illustrated, the profiled bore 56 is provided with a plurality of triangularly shaped indentations 120 arranged in peripheral arcs at generally equally spaced intervals about the axis 22, and the lower plate member 64 has a plurality of radially extending cavities 122 which open radially outwardly to individually receive a plunger 124 having a semi-cylindrically rounded nose 126. A corresponding plurality of coiled compression springs 128 individually urge the respective plungers radially outwardly into a precisely indexed relationship with the indentations with the forces being balanced around the upright axis 22 because of the symmetrical disposition of the plungers. Thus, the control assembly 20 can be rotated about the upright axis by movement of the actuator 16 a preselected angular amount, for example approximately 15° between the stationary indentations 120. As shown in FIG. 2, rotatable indicia 130 are provided on the rotatable turret member 66 to indicate to the operator that the centralmost position of the handle or first control member 72 corresponds to a neutral mode of operation of the transmission 12, whereas urging the handle forwardly or in a clockwise direction corresponds to a forward mode and urging the handle backwardly or in a counterclockwise direction corresponds to a reverse mode as is illustrated.

Figure 6:
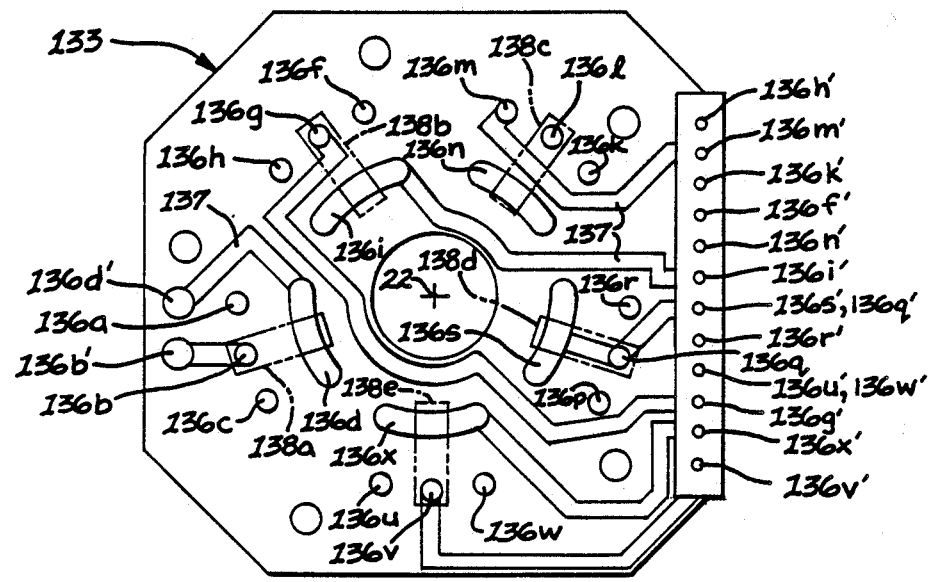
FIG. 6 is a diagrammatic and enlarged plan view solely of a directional switching contact board as taken along line VI—VI of FIG. 4.

As best shown in FIGS. 4 and 6, the transmission control mechanism 10 contains rugged and yet compact electrical means 131 within it for selectively actuating the solenoids 14a–14f. This electrical means advantageously includes a first rotary type switching device 132 actuated by the sweeping movement of the handle 72 and which has a stationary first printed circuit board or directional switching contact board 133 that is electrically coupled to and/or is seated upon a supporting interface board 134 by a plurality of pin and socket type connectors as generally indicated at 135 in any convenient manner. The supporting interface board 134 is electrically coupled to the lower extremity of the second wiring harness 78 by a connector 139 secured thereto, is generally entrapped between the lower and upper housings 24 and 26, and is electrically coupled to the top of the first wiring harness 46. A plurality of upstanding contact members 136 are arranged at preselected radii in five groups 136a–d, 136f–i, 136k–n, 136p–s, and 136u–x on the upper surface of the directional switching contact board 133. A plurality of electrically conducting tracks 137 formed on the upper and lower surfaces of this otherwise nonconducting board electrically communicate each of these contacts with a plurality of edge connectors or terminals. While for clarity the tracks are not illustrated on the lower surface of the contact board in FIG. 6, each of the edge connectors is electrically linked directly to one or more contact members as is identified by a prime indicator associated with the corresponding contact number. Hence, the edge connectors are convenient to couple to the supporting interface board 134.

The first switching device 132 further includes five equally peripherally spaced wiper members 138a–138e which are associated with the revolvable control assembly 20. Each of these wiper members has a contact-engaging surface which is generally radially arranged and makes sweeping electrical contact with selected pairs of the contact members 136 on the directional switching contact board 133 as is shown in phantom outline form in FIG. 6, although only one representative wiper member 138 is illustrated in FIG. 4. FIG. 8 illustrates one representative embodiment wiper member 138 which has either a rectangular wiper surface 140 as shown, or a slightly pie-shaped wiper surface not shown, and a cavity 142 at a right angle thereto which is adapted to receive a coiled compression spring 144. The wiper members are preferably stamped from a sheet material such as brass, are mechanically folded to the desired shape, and can be provided with a wear-resistant coating on the surface 140. As representatively illustrated in FIG. 4, the wiper-holding plate member 64 defines a plurality of profiled cavities 146 for nonrotatably receiving the individual wiper members and the compression springs. These cavities are substantially equally spaced peripherally about the central axis 22 so that the wiper members 138a–138e are urged downwardly against the selected ones of the upstanding and grouped contact members 136.

Figure 5:
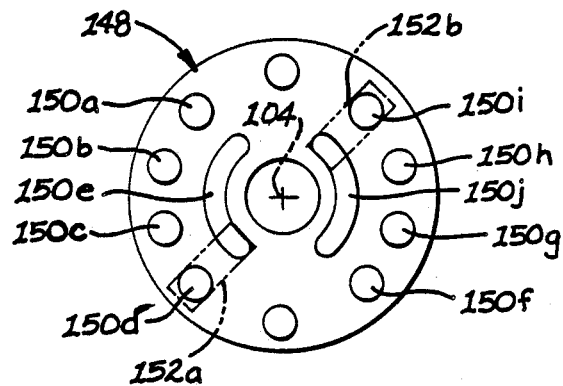
FIG. 5 is a diagrammatic and enlarged plan view solely of a speed switching contact board as taken along line V—V of FIG. 3.

As is shown in FIGS. 3 and 5, the electrical means 131 also includes a second rotary type switching device 147 actuated by the limited rotating movement of the hand grip portion 88. This second switching device includes a second printed circuit board or speed switching contact board 148 that is electrically coupled to the upper end of the second wiring harness 78. The speed switching contact board is seated on the support member 94 of the mounting portion 86, and also has a plurality of upstanding contact members 150 arranged at preselected radii in two groups 150a–150e and 150f–150j. In this instance, the second switching device has two diametrically opposite and radially oriented wiper members 152a and 152b which rotate with the hand grip portion as shown in phantom outline in FIG. 5, although only one wiper member 152 is illustrated in FIG. 3. By the term "radially oriented wiper member" as used herein, it is meant that the wiper surface 140 thereof is elongate in the radial direction from the respective axes 22 and 104. Each of the wiper members 152a and 152b is also urged in an axial direction, parallel to the axis 104 or downwardly and to the right at an inclined angle when viewing FIG. 3, by a coiled compression spring 154 so that each one engages selected pairs of the grouped contact members 150. In this regard, it is to be appreciated that the upper surfaces of each of the contact members 136 and 150 are preferably dome shaped and preferably coated with an electrically conducting, wear-resistant material for improved electrical contact with the individual wiper members.

The first wiring harness 46 shown in FIG. 1 has a supply and accessory actuating portion 156 and a solenoid actuating portion 158, and these portions of the electrical means 131 are illustrated in FIG. 7 within the context of a full electrical circuit diagram for the transmission control mechanism 10. There are nine lines 160a–160i associated with the supply and accessory actuating portion, and there are twelve lines 162a–162l associated with the solenoid actuating portion. The connection of these lines is shown by the following chart:

160a: to a first power source 164
160b: to a common ground 166
160c: to a second power source 168
160d: to a back-up alarm 170
160e: to a third power source 172
160f: to a start relay 174
160g: to a start relay 174
160h: from the key switch 176
160i: from the key switch 176
162a: supply side lead to forward clutch solenoid 14a
162b: ground side lead to forward clutch solenoid 14a
162c: supply side lead to reverse clutch solenoid 14b
162d: ground side lead to reverse clutch solenoid 14b
162e: supply side lead to first speed clutch solenoid 14c
162f: ground side lead to first speed clutch solenoid 14c
162g: supply side lead to second speed clutch solenoid 14d
162h: ground side lead to second speed clutch solenoid 14d
162i: supply side lead to third speed clutch solenoid 14e
162j: ground side lead to third speed clutch solenoid 14e
162k: supply side lead to fourth speed clutch solenoid 14f
162l: ground side lead to fourth speed clutch solenoid 14f As is shown in FIG. 7, the electrical means includes voltage spike suppression means 178 for suppressing the voltage spikes caused by the disengagement of the solenoids 14a–14f, and thereby increasing the service lives of the contact members 136 and 150, and the wiper members 138 and 152. This voltage spike suppression means includes a plurality of diodes 180a–180f which are individually electrically connected to the supply side leads 162a,c,e,g,i,k and to the ground side leads 162b,d,f,h,j,l communicating with the respective solenoids. Each of these diodes is thus located electrically downstream of the respective wiper members and essentially across one of the solenoids, so that any surge in voltage in the positive supply side lead will be communicated to the ground side lead at the preselected setting of the diode. These diodes 180 can be connected to the supporting interface board 134 within the support assembly 18 as is representatively illustrated by the one diode illustrated in FIG. 4.

Alternate Embodiment

Referring to FIGS. 9 and 10, an alternate embodiment electrical transmission control mechanism 10, includes an interlock device 190 for maintaining the upper control assembly 20' in a preselected angular orientation about the upright axis 22' with respect to the lower support assembly 18'. More particularly, the handle 72' is securely held in the 9 o' clock position illustrated in FIG. 9 and corresponding to neutral by the interlocking cooperation of an outwardly extending tang or arm 191 and a pivotable locking element 192. While the tang 191 is rigidly secured to the control assembly and movable therewith as in the first embodiment pivotally between forward-neutral-reverse, the locking element 192 is mounted on a pin 193 cantileverably extending from the support assembly 18'. The locking element has a downwardly facing locking slot 195 so that the locking element 192 can be manually pivoted by the vehicle operator about a central axis 196 of the pin 193 and into engagement with the tang 191 only when the handle 72' is disposed in neutral. Normally, for example, the locking element is flipped over about the axis 196 and away from the tang, at which time the tang can swing between a pair of angularly spaced apart pivot limiting surfaces 197 and 198 formed on the support assembly 18' when the handle 72' is swung to the forward and reverse gear actuating positions.

Industrial Applicability

In operation, assuming that the engine or power plant of the vehicle is not running, although not illustrated, the electrical transmission control mechanism 10 will not allow the engine to be started with the handle 72 of the control assembly 20 positioned in either of the forward or reverse operating modes. Specifically, the first group of contact members identified by the numbers 136a-136d in FIG. 6 are so positioned relative to the wiper member 138a that electrical current is unable to be transmitted therethrough in forward or reverse. It is only when the wiper member 138a is in the centered position illustrated in FIG. 6, corresponding to a neutral position of the handle, that electricity can be directed between the contact elements 136b and 136d that a closed switch is effected. As may be visualized with reference to the right side of FIG. 7, the closing of this neutral start switch allows the key switch 176 associated with lines 160h and 160i to be electrically coupled to the start relay 174 associated with lines 160f and 160g. The operator can then manipulate the key switch in a normal manner to cause current to be directed to the start relay and to start the engine as can be readily appreciated by those skilled in the art.

With the engine running, the transmission 12 is supplied with hydraulic power that can be utilized for operating the vehicle by the selected operation of one of the two directional solenoids 14a and 14b, and one of the four speed solenoids 14c-14f. For example, assuming that the hand grip portion 88 of FIG. 3 is rotated about the axis 104 to a position corresponding to first gear or to the low speed gear position, then the opposite wiper members 152a and 152b illustrated in FIG. 5 are in the positions shown and the respective pairs of contacts 150d and 150e, and 150i and 150j are in electrical contact as can also be recognized by viewing the diagram of FIG. 7. However, if the handle 72 is centered in neutral, no electricity is directed to the hand grip portion because the wiper member 138e of the fifth group of contact members 136u-136x shown in FIG. 6 does not connect electrical power from line 160a and contact member 136x to either of the contact members 136u and 136w and the line 150e connected thereto. Rather, the wiper member 138c electrically connects the contacts 136l and 136n together such that the second power source 168 and the line 160c communicate electrical power through line 162k to the positive lead of the fourth speed solenoid 14. The ground line 162l to the fourth speed solenoid is also coupled to the ground line 160b via the direct connection of the contact members 136g and 136i by the wiper member 138b. Thus, in accordance with one feature of the invention no electrical power is directed to the hand grip portion 88 in neutral so that any unexpected electrical short therein would not cause inadvertent movement of the vehicle.

The feature of assuring that one specific clutch of the transmission 12 is actuated when the handle 72 is in neutral, independent of the rotational position of the hand grip portion, assures that the transmission will be positively operating in a favorable ratio. In this instance, the automatic operation of the fourth speed solenoid 14f or the highest speed clutch is advantageous in that the various elements of the transmission 12 are operated in the most favorable condition to minimize the overspeeding thereof during any coasting mode of the vehicle.

Assuming next that the vehicle operator wishes to travel in first speed forward, the hand grip portion 88 is already in the first speed mode and it is only necessary to urge the handle 72 forwardly whereupon the control assembly 20 is rotated about axis 22 to a forward control mode. The second group of contact members 136f-136i and the third group of contact members 136k-136n shown in FIGS. 6 and 7 are effective to couple electrical power of the second power supply 168 and the first power supply 164 to the positive lines 162a and 162e of the forward clutch solenoid 14a and the first speed clutch solenoid 14c respectively. Simultaneously the ground lines 162b and 162f of these same solenoids are coupled to the electrical ground 166. More particularly, the contact members 136k and 136n, 136f and 136i, 150d and 150e, and 150i and 150j of FIG. 7 are electrically coupled together by the wiper members 138c, 138b, 152a and 152b of FIGS. 6 and 5, respectively. In forward, the contact members 136x and 136u are electrically coupled together by the wiper member 138e.

A shift from first speed forward to second speed forward is accomplished by rotation of the hand grip portion 88 to the second gear mode. This breaks the electrical connections of the contact members 150d and 150e, and 150i and 150j, and couples the contact members 150c and 150e, and 150h and 150j leading to the first power source 164 and the electrical ground 166 respectively.

A shift to third speed forward from second speed forward by further rotation of the hand grip portion 88 causes the wiper members 152a and 152b to break the electrical connection of the contact members 150c and 150e, and 150h and 150j, and to couple the contact members 150b and 150e, and 150g and 150j to the first power source 164 and the electrical ground 166.

Likewise, a shift to fourth speed forward from third speed forward breaks the electrical connection of the contact members 150b and 150e, and 150g and 150j, and couples the contact members 150a and 150e, and 150f and 150j to the first power source 164 and the electrical ground 166, respectively.

A shift from a neutral position of the control handle 72 to a reverse mode with the hand grip portion 88 in the first gear position is effective to couple the second power source 168 through the contact members 136m and 136n via the wiper member 138c to the power line 162c of the reverse solenoid 14b. Also, the ground 166 is connected through the contact members 136i and 136h and the wiper member 138b to the ground line 162d of the reverse solenoid. Moreover, in this mode the contact members 136q and 136r are electrically connected because the wiper member 138d of the fourth group of contact members 136p-136s extends radially between contact members 136r and 136s, and the contact members 136q and 136s are always electrically connected together. This is effective to couple the third accessory power source 172 to the back-up alarm 170 so that bystanders will be alerted that the vehicle is backing up for safety reasons.

In view of the above, it can be appreciated that the electrical means 131 is simple, compact and rugged in construction. Moreover, the electrical means includes voltage spike suppression means 178 and is so constructed and arranged as to provide an extended service life of the contacts 136 and 150, and the wiper members 138 and 152. The first rotary switching device 132 is particularly compact in the direction of axis 22 and is protectingly contained within the support assembly 18 and the control assembly 20. Likewise, the second rotary switching device 147 is particularly compact in the direction of axis 104 as well as being radially compact so that it can be protectingly contained within the easily grasped handgrip portion 88. A substantial portion of the individual parts of the transmission control mechanism 10 are constructed of non-conducting plastic such as a mineral-filled Nylon material that has dimensional stability through a wide temperature range along with substantial strength. The first and second detent apparatuses 102 and 118 provide a good feel to the operator in positively establishing the forward-neutral-reverse modes and the first, second, third and fourth speed modes respectively. And, the electrical switching devices accomplish with particular efficiency a number of functional tasks that maximizes the safe operation of the transmission 12 and any vehicle in which it is installed. The double-fault failure mode of the instant mechanism that involves disconnecting both leads of one clutch actuating solenoid and connecting both leads of another solenoid, and which can be referred to as "ground side switching", is considered especially desirable when compared with the single-fault failure mode that is possible with prior art mechanisms. In other words, the instant mechanism requires two faults or unexpected electrical events before inadvertent operation of a solenoid, whereas prior art devices can fail by a single fault.

Other aspects, objects and advantages of this invention can be obtained from a study of the drawings, the disclosure and the appended claims.

We claim:

1. An electrical transmission control mechanism for shifting a transmission by controllably actuating a plurality of clutch actuating solenoids individually having a supply side lead and a ground side lead, comprising:
   a control assembly;
   a support assembly for pivotally supporting the control assembly for movement about a central axis; and
   electrical means for ensuring that a single system electrical fault does not cause unexpected shifting of the transmission and for controllably disconnecting both the supply and ground side leads of at least one of said solenoids, connecting both the supply and ground side leads of at least one other of said solenoids in response to movement of the control assembly about the central axis, and shifting at least one of the speed and direction of the transmission.

2. The electrical transmission control mechanism of claim 1 wherein the electrical means includes a printed circuit board connected to the support assembly and having a plurality of contact members thereon, and a plurality of radially oriented wiper members connected to the control assembly for sweeping engagement with the contact members in response to rotation of the control assembly about the central axis.

3. The electrical transmission control mechanism of claim 2 wherein the control assembly includes a first control member, a second control member on the first control member, and the electrical means includes another printed circuit board connected to the first control member and having a second plurality of contact members thereon and another plurality of wiper members connected to the second control member for sweeping engagement with the second plurality of contact members in response to rotation of the second control member.

4. The electrical transmission control mechanism of claim 2 wherein the plurality of contact members of the printed circuit board includes a first group of upstanding contact members effective to communicate an electrical power source to the selected supply side lead in response to sweeping movement of a first one of the wiper members, and a second group of upstanding contact members effective to communicate an electrical ground to the selected ground side lead in response to sweeping movement of a second one of the wiper members.

5. The electrical transmission control mechanism of claim 4 wherein the electrical means includes neutral start means for assuring that the introduction of electrical power for starting is available solely when the control member is disposed in the neutral operating mode, and wherein the neutral start means includes a third group of upstanding contact members on the switching contact board cooperatively engaged by a third one of the wiper members.

6. The electrical transmission control mechanism of claim 5 wherein the electrical means includes back-up alarm means including a fourth group of upstanding contact members on the switching contact board cooperatively engaged by a fourth one of the wiper members for actuating an alarm when the control member is in the reverse mode.

7. The electrical transmission control mechanism of claim 1 wherein the electrical means includes a printed circuit board having a plurality of upstanding contact members arranged at preselected radii about the central axis, and a plurality of radially oriented wiper members disposed for controlled bridging engagement against pairs of the contact members, wherein the plurality of clutch actuating solenoids includes a forward solenoid and a reverse solenoid, and wherein a first one of the wiper members and a first plurality of the contact members cooperate to controllably communicate an electrical power source to one of the forward solenoid and the reverse solenoid.

8. The electrical transmission control mechanism of claim 7 wherein the control assembly is movable between a forward position and a reverse position to an intermediate neutral position, and wherein the plurality of clutch actuating solenoids includes a preselected speed clutch solenoid, and the first one of the wiper members cooperates with the first plurality of contact members to communicate the electrical power source to the preselected speed clutch solenoid when the control assembly is disposed in the neutral position.

9. An electrical transmission control mechanism for shifting a transmission by controllably actuating a plurality of clutch actuating solenoids, comprising:
   a control assembly;
   a support assembly for pivotally supporting the control assembly for limited rotation about a central axis; and electrical means for changing at least one of the output speed ratio of the transmission and the direction of rotation of the output of the transmission by electrically actuating individual ones of the solenoids with swinging movement of the control assembly, the electrical means including a rotary switching device connected generally between the control assembly and the support assembly and including a printed circuit board defining a plurality of upstanding contact members arranged at preselected radii about the central axis, first and second radially oriented wiper members connected to the control assembly for controlled bridging engagement against selected pairs of the contact members, an electrical power source, and a common electrical ground, the first wiper member being adapted to connect the selected one of the solenoids to ground and disconnecting another one of the solenoids from the ground, and the second wiper member being adapted to connect the selected one of the solenoids to the power source and disconnecting another one of the solenoids from the power source.

10. The electrical transmission control mechanism of claim 9 wherein the control assembly includes a first control member defining a second axis extending substantially radially outwardly from the central axis, a second control member on the first control member, and the electrical means includes another rotary switching device having another printed circuit board connected to the first control member and defining another plurality of upstanding contact members arranged at preselected radii about the second axis, and another plurality of radially oriented wiper members connected within the second control member for controlled bridging engagement against selected ones of the another plurality of contact members with rotary movement of the second control member about the second axis.

11. The electrical transmission control mechanism of claim 10 wherein each of the solenoids has a supply side lead and a ground side lead, and the rotary switching devices individually function to controllably disconnect both of the supply and ground side leads of at least one of said solenoids and to controllably connect both of the supply and ground side leads of at least one other of said solenoids in response to rotation of one of the first control member and the second control member.

12. The electrical transmission control mechanism of claim 10 wherein the electrical power source is connected to the printed circuit board of the another rotary switching device, the rotary switching device has a neutral position and means for interrupting the transmission of electrical energy to the printed circuit board of the another rotary switching device when the rotary switching device is in the neutral position.

13. The electrical transmission control mechanism of claim 9 including interlock means for selectively mechanically maintaining the control assembly in a preselected angular position on the support assembly corresponding to a neutral mode of operation of the transmission.

14. The electrical transmission control mechanism of claim 13 wherein the interlock means includes a tang on the control assembly and a locking element pivotally connectable to the support assembly and interlockingly engageable with the tang solely in the neutral mode.

15. An electrical transmission control mechanism for shifting a transmission by controllably actuating a plurality of directional clutch actuating solenoids and a plurality of speed clutch actuating solenoids, comprising:
a stationary member;
first and second control members;
support means for supporting the first control member for relative pivotal movement about a first axis on the stationary member and for supporting the second control member for relative pivoted movement about a second axis on the first control member;
electrical means for changing at least one of the speed ratio of the output of the transmission and the direction of rotation of the transmission including first and second rotary switching devices, the first rotary switching device including a first printed circuit board defining a first plurality of contact members arranged at preselected radii from the first axis thereof and a first plurality of radially oriented wiper members, the second rotary switching device including a second printed circuit board defining a second plurality of contact members arranged at preselected radii from the second axis thereof and a second plurality of radially oriented wiper members, and wherein the first control member is movable to cause relative sweeping movement between the wiper members and the contact members of the first rotary switching device and thereby the selective actuation of one of the directional clutch actuating solenoids, and the second control member is movable to cause relative sweeping movement between the wiper members and the contact members of the second rotary switching device and the selective actuation of one of the speed clutch actuating solenoids.

16. An electrical transmission control mechanism for shifting a transmission by controllably actuating a pair of directional clutch actuating solenoids and a plurality of speed clutch actuating solenoids and with said solenoids individually having a supply side lead and a ground side lead, comprising:
a control assembly having an actuator rotatably mounted thereon on a first axis;
a support assembly for pivotally supporting the control assembly for movement about a second axis; and
electrical means for controllably disconnecting both the supply and ground side leads of one of said directional clutch actuating solenoids, connecting both the supply and ground side leads of the other one of said directional clutch actuating solenoids in response to movement of the control assembly about the second axis, and for controllably disconnecting both the supply and ground side leads of at least one of said speed clutch actuating solenoids, connecting both the supply and ground side leads of at least one other of said speed clutch actuating solenoids in response to rotation of the actuator about the first axis, and thereby shifting the direction and speed of the transmission.

17. An electrical transmission control mechanism for shifting a transmission by controllably actuating a plurality of clutch actuating solenoids individually having a supply side lead and a ground side lead, comprising:
a control assembly;
a support assembly for pivotally supporting the control assembly for movement about a central axis;

electrical means for controllably disconnecting both the supply and ground side leads of at least one of said solenoids, connecting both the supply and ground side leads of at least one other of said solenoids in response to movement of the control assembly about the central axis, and shifting at least one of the speed and direction of the transmission;

wherein the electrical means includes a switching contact board connected to the support assembly, and a plurality of wiper members connected to the control assembly for sweeping engagement with the switching contact board in response to rotation of the control assembly about the central axis;

wherein the switching contact board has a first group of upstanding contact members effective to communicate an electrical power source to the selected supply side lead in response to sweeping movement of a first one of the wiper members, and a second group of upstanding contact members effective to communicate an electrical ground to the selected ground side lead in response to sweeping movement of a second one of the wiper members;

wherein the electrical means includes neutral start means for assuring that the introduction of electrical power for starting is available solely when the control member is disposed in the neutral operating mode; and wherein the neutral start means includes a third group of upstanding contact members on the switching contact board cooperatively engaged by a third one of the wiper members.

* * * * *